United States Patent
Davydov

(10) Patent No.: US 12,355,507 B2
(45) Date of Patent: Jul. 8, 2025

(54) METHOD FOR TRANSMITTING SIGNALS BETWEEN A MASTER DEVICE AND A SLAVE DEVICE

(71) Applicant: Denis Alexandrovich Davydov, Yekaterinburg (RU)

(72) Inventor: Denis Alexandrovich Davydov, Yekaterinburg (RU)

( * ) Notice: Subject to any disclaimer, the term of this patent is extended or adjusted under 35 U.S.C. 154(b) by 72 days.

(21) Appl. No.: 18/288,863

(22) PCT Filed: Feb. 20, 2022

(86) PCT No.: PCT/RU2022/050053
§ 371 (c)(1),
(2) Date: Oct. 30, 2023

(87) PCT Pub. No.: WO2022/231473
PCT Pub. Date: Nov. 3, 2022

(65) Prior Publication Data
US 2024/0204821 A1   Jun. 20, 2024

(30) Foreign Application Priority Data

Apr. 30, 2021   (RU) .............. RU2021112799

(51) Int. Cl.
*H04B 3/04*   (2006.01)
*H04B 3/56*   (2006.01)

(52) U.S. Cl.
CPC ............... *H04B 3/04* (2013.01); *H04B 3/56* (2013.01)

(58) Field of Classification Search
CPC ......... H04B 3/04; H04B 3/56; G06F 13/4282; H04R 3/00
See application file for complete search history.

(56) References Cited

U.S. PATENT DOCUMENTS

| 9,627,186 B2 | 4/2017 | Valcore, Jr. et al. |
| 9,867,186 B2 | 1/2018 | Xu et al. |
| 2019/0012291 A1* | 1/2019 | Biniguer ............ G06F 13/4295 |

FOREIGN PATENT DOCUMENTS

| RU | 2539648 C2 | 1/2015 |
| RU | 2015136973 A | 1/2018 |

* cited by examiner

*Primary Examiner* — David S Huang

(57) ABSTRACT

A method for transmitting signals between a master device and at least one slave device is disclosed. The master device has at least two external first-kind contacts, at least one internal power supply line, a voltage measurement means and at least one external second-kind contact connected directly to the voltage measurement means and, via an impedance, to one internal power supply line. The method comprises the steps of detecting a connection between one of the master device second-kind contacts and a slave; identifying the master device first-kind contact to which the slave device is connected; changing the voltage between the first-kind contact to which the slave device is connected and the internal power supply line; generating a signal in the slave device; and receiving the signal in the master device by measuring the voltage at the second-kind contact to which the slave device is connected.

20 Claims, 4 Drawing Sheets

METHOD FOR TRANSMITTING SIGNALS BETWEEN A MASTER DEVICE AND A SLAVE DEVICE

TECHNICAL FIELD

The present invention relates to radio engineering, in particular, to methods for transmitting signals between devices. The invention can be most advantageously used where one master device has a plurality of contacts to which a plurality of slave devices is connected, each slave device being connected to two contacts, and signals are transmitted therebetween. The invention can be used in structures of electronic components to enable data exchange between such components forming part of communications systems, remote control systems, telemetry systems, educational and children's playing equipment.

DESCRIPTION OF THE PRIOR ART

There is known a data communication protocol 1-Wire designed by Dallas Semiconductor Corporation. One implementation of the protocol is disclosed in U.S. Pat. No. 5,210,846 (One-Wire Bus Architecture, published 29 Jun. 1999, IPC G11C8/20). According to this prior art solution, a bi-directional connection is established between a master device and slave devices via two electrical lines to exchange data and to supply power to the slave devices, which is the main specific feature of the prior art protocol. Data exchange is initiated by the master device. Having received power, the slave devices transmit a presence pulse into the communication line. Data is exchanged byte-wise using so called 'time slots', each pulse transmitted into the communication line corresponding to one bit of information. There 4 types of time slots: '1' or '0' receipt by the master device, '1' or '0' transmission to a slave device. Duration of any time slot is limited in time, a time interval being provided between consecutive time slots. There are many other implementations of this prior art protocol, which are disclosed in other patents.

A prior art device for data acquisition and transmission via an electrical network is disclosed in Utility Model Patent No. RU 102 404 (published 27 Feb. 2011, IPC G06F 13/00). The prior art device is connected to an electrical network together with M similar devices such as to form a network of M+1 devices. Each device is assigned an identification number, and one of the devices is designated as a base device. The base device polls the networked devices by sending polling signals in the form of high-frequency modulated pulses to the network. Each such signal contains data on the interrogated device (modem) identification number and the type of requested information. The signal is then retransmitted, according to the requested information type, from the interrogated modem to an external primary information device (a counter, a concentrator, etc.) via an RS-485 interface. The signal from the primary information device is received back by the modem from which it is then returned, in the form of a train of high-frequency modulated pulses, back to the electrical network and is received by the base device where it is transformed into a data packet to be recorded.

A prior art method for coupling data transmission/receipt devices via a combined two-wire communication and direct current power supply line is disclosed in Invention Patent No. RU 2 474 958 (published 10 Feb. 2013, IPC H04B 3/00). The prior art method comprises modulating, in the device transmitter, a carrier signal of hundreds kilohertz in the form of a digital data signal; summing the radio signal so produced with power supply voltage and transmitting thereof via the combined communication and power supply line; extracting, in the device receiver, the data radio signal from the summed line voltage; reconstructing, in the device receiver, the original digital signal; decoding, by means of a controller, the signal, and generating a response signal for the transmitter.

A prior art system for interconnecting a wired communications line, configured to transmit a signal containing both electric power and data, with a control unit is disclosed in Invention Patent No. RU 2 539 648 (published 20 Jan. 2015, IPC H04B 3/54). In the prior art system, the control unit comprises an electric power terminal and a data terminal. The wired communications line has a characteristic impedance. The system is configured to receive a signal containing both electric power and data, the electric power and the data having the same frequency spectrum.

A disadvantage common to the above prior art solutions is that increasing the number of contacts for connecting slave devices on the master device leads to more complex hardware implementation of the signals exchange on the hardware level. Said complex implementation requires an individual receipt/transmission circuit to be provided at each contact of the master device. Furthermore, it becomes difficult to identify the contacts to which slave devices are connected.

SUMMARY OF THE INVENTION

It is a technical object of the present invention to provide a relatively simple technical means for signal transmission, produced from inexpensive and abundant components.

A technical result provided by the present invention is a simpler design of circuitry for signal transmission between a master device and slave devices connected thereto.

A further technical result is the possibility to use more inexpensive and abundant components for signal exchange implementation.

The claimed invention is a method for transmitting signals between a master device and at least one slave device. The master device has at least two external first-kind contacts, at least one internal power supply line, a voltage measurement means and at least one external second-kind contact connected directly to the voltage measurement means and, via an impedance, to one internal power supply line. The method comprises the steps of:
  detecting a connection between one of the master device second-kind contacts and a slave device by determining the voltage at such second-kind contact;
  identifying the master device first-kind contact to which the slave device is connected by setting different voltages at the first-kind contacts and determining the voltage at the second-kind contact;
  changing the voltage between the first-kind contact to which the slave device is connected and the internal power supply line connected, via the impedance, to the second-kind contact to which the slave device is connected;
  generating a signal in the slave device by changing resistance between the contacts connected to the master device; and
  receiving the signal in the master device by measuring the voltage at the second-kind contact to which the slave device is connected.

Further advantages and essential features of the present invention are described with reference to the following particular embodiments.

In particular, connection is detected between the master device and more than one slave device.

In particular, the impedance between the master device second-kind contact and the internal power supply line is configured as an element selected from the group including a resistor, a capacitor and an inductance coil, or a combination thereof.

In particular, the voltage measurement means is an analog-to-digital converter, each channel of which is connected to at most one second-kind contact.

In particular, the voltage measurement means comprises an analog-to-digital converter and at least one voltage summator, each input of each voltage summator being connected to one second-kind contact, and the output of each voltage summator being connected to a channel of the analog-to-digital converter.

In particular, the voltage measurement means comprises an analog-to-digital converter and at least two resistors, each resistor being connected to one second-kind contact and one channel of the analog-to-digital converter, more than one resistor being connected to at least one channel of the analog-to-digital converter.

In particular, in order to measure the voltage at the second-kind contact, different voltages are set in the internal power supply lines.

In particular, identifying the first-kind contact to which the slave device is connected includes dividing the first-kind contacts into two groups, one and the same voltage being set at all contacts in the first group, one and the same voltage, different from the voltage at the contacts in the first group, being also set at the contacts in the second group.

In particular, receiving the signal in the master device includes setting a voltage of one magnitude in one internal power supply line and setting one and the same voltage of other magnitude in the rest of the internal power supply lines and at the first-kind contacts.

In particular, changing the voltage between the first-kind contact to which the slave device is connected and the internal power supply line connected, via the impedance, to the second-kind contact to which the slave device is connected, includes reversing the sign of said voltage.

In particular, the slave device is a circuit consisting of passive electric elements. The slave device may be a rectifier diode or other rectifying element. An analog signal from an external device may be transmitted via the slave device to the master device.

In particular, the slave device receives power from its two contacts connected to the master device.

In particular, the slave device includes a voltage converter converting voltages at two contacts of the slave device, which are connected to the master device, into direct voltage. Other elements of the slave device may receive power from the outputs of said voltage converter. An external device connected to the slave device may receive power from the outputs of said voltage converter. The voltage converter is capable of converting high voltage to low voltage.

In particular, a digital or a synchronizing signal is generated in the master device by changing the voltage between the first-kind contact to which the slave device is connected and the internal power supply line connected, via the impedance, to the second-kind contact to which the slave device is connected, said signal being received in the slave device by measuring the voltage at the two contacts connected to the master device.

In particular, resistance between the two contacts connected to the master device is changed by connecting and disconnecting a resistor.

In particular, a digital or a synchronizing signal is generated in the slave device by varying the time interval between the resistor connections and disconnections.

In particular, signals from the master device to the slave device and from the slave device to the master device are transmitted simultaneously.

The claimed method allows transmitting analog signals (e.g. from analog sensors) and digital signals (digital sensors, indication means), thereby obviating the need to provide analog-to-digital converters (ADC) and digital-to-analog converters (DAC) in the slave devices.

In case of digital signals transmission of, simultaneous bi-directional transmission is possible, thus increasing the overall transmission rate and making it possible to reduce requirements to timing characteristics of employed components.

In case of unidirectional transmission of digital signals, the backwards signal may be used as a synchronizing signal, thereby obviating the need to provide a clock in the slave device.

Where the master device has a large number of outputs, the described method allows using one multichannel ADC and a plurality of resistors which are inexpensive and abundant.

The claimed method is designed to be implemented in systems comprised of one master device having a plurality of external contacts and a plurality of slave devices connectible, via two contacts, to the master device, while not having a built-in power supply source. The method enables simultaneous power transmission from one master device to the plurality of slave devices and signals.

A simpler design of circuitry for signal transmission between a master device and slave devices connected thereto via two contacts is obtained by obviating the need for providing analog-to-digital converters (ADC) or digital-to-analog converters (DAC) in the slave devices, by making possible simultaneous bi-directional transmission of signals between the master device and the slave devices, by using a response signal generated in a slave device as a synchronizing signal (thus obviating the need to provide a clock in the slave device), by utilizing one multichannel ADC and a plurality of resistors in the master device.

The terms 'first-kind contact' and 'second-kind contact' are used to distinguish the functions of said contacts. A first-kind contact has a voltage setting function. A second-kind contact has a voltage setting function and a voltage measurement function. Where a contact's circuitry is designed such that the contact is capable of both voltage setting and voltage measurement, such contact may, under different conditions, function either as first-kind contact, or a second-kind contact.

DETAILED DESCRIPTION OF EMBODIMENTS

Figure 1:
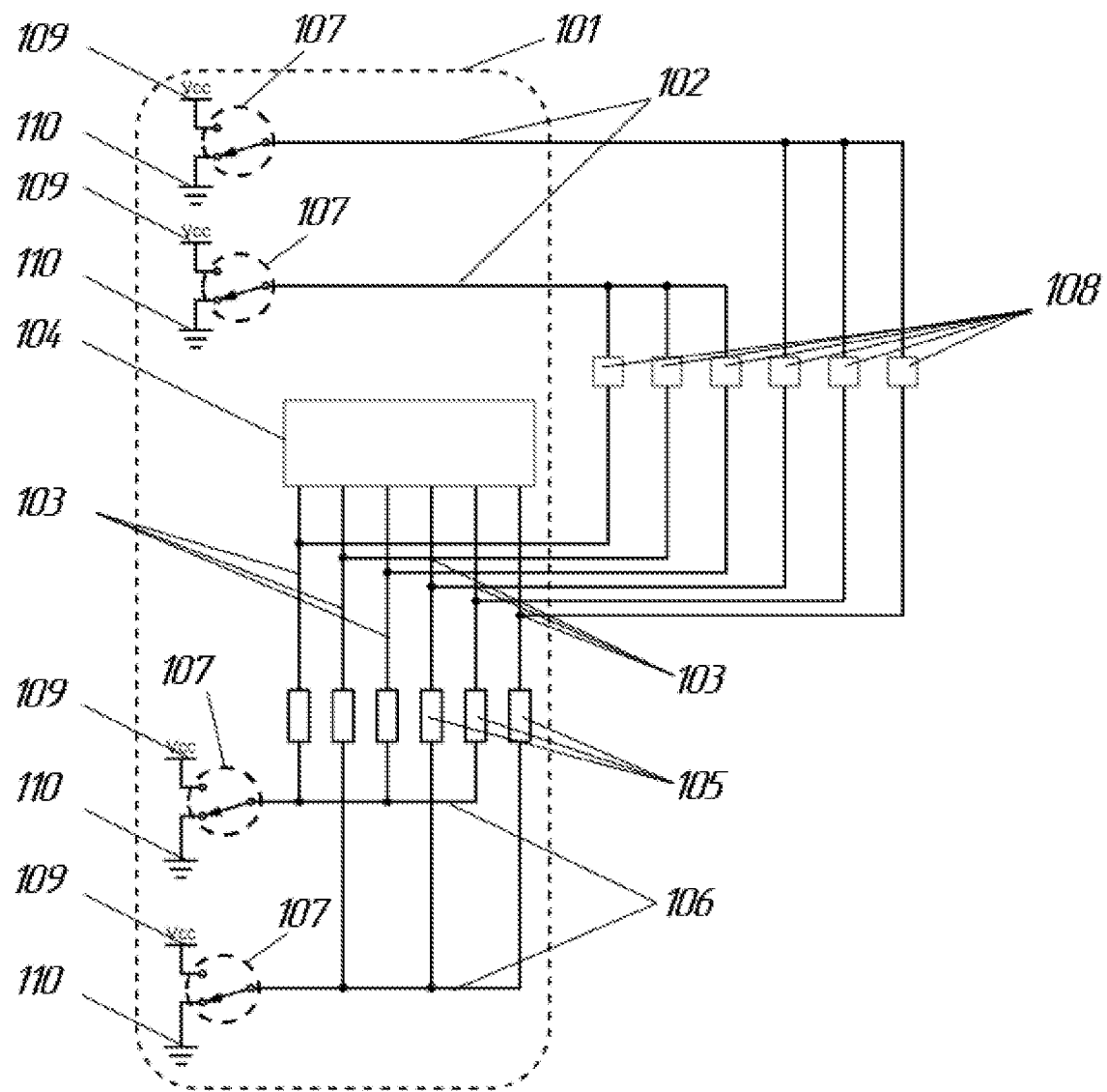
FIG. 1 shows an example functional arrangement of a system implementing the claimed method for transmitting signals via a power supply circuit.

As shown in FIG. 1, a master device 101 may have a plurality of first-kind 102 and second-kind 103 contacts to which one or more slave devices are connected via electrical lines. Each second-kind 103 contact is connected to a voltage measurement device 104 and, via an impedance 105, to one internal power supply line 106. In the present example, the voltage between the first-kind 102 contacts and the internal power supply line 106 is changed by switching switches 107 between sides of a power supply source: a first side (positive side Vcc) 109 and a second side (ground) 110.

The master device 101 may further comprise one or more internal power supply lines not coupled to the first-kind 102 or second-kind 103 contacts. Such lines are intended for supplying power to internal elements of the device 101.

Preferably, a multi-channel ADC is used as the voltage measurement means 104, each second-kind 103 contact being connected to one channel of the ADC.

Figure 2A:
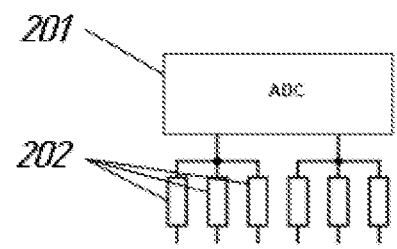
FIGS. 2a-2b show example implementations of the voltage measurement means.

FIG. 2a illustrates an implementation, wherein the voltage measurement means 104 is the ADC 201 to one channel of which several second-kind 103 contacts are connected via resistors 202. Thus, in each channel of the ADC 201, a voltage is produced equal to an average of voltages at all the contacts connected thereto. Preferably, each second-kind 103 contact connected to the one channel of the ADC 201 is connected, via the impedance 105, to an individual internal power supply line 106. With such circuitry design, when measuring voltage at a second-kind contact, one and the same voltage is preferably set at all first-kind 102 contacts and all, but one, power supply lines 106. If these conditions are met, one and the same voltage will be set at all, but one, second-kind 103 contacts connected to the one channel of ADC 201, and it will be possible to determine the voltage at the said one contact based on readings from ADC 201.

Figure 2B:
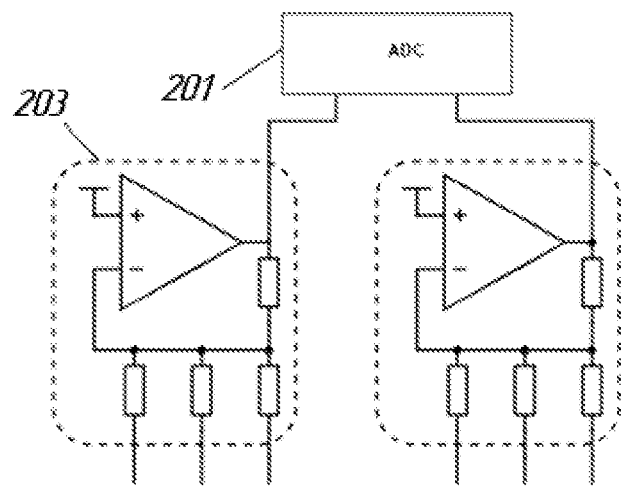

FIG. 2b illustrates an implementation, wherein the voltage measurement means 104 is the ADC 201 to one channel of which an output of a summator 203 is connected, the second-kind 103 contacts being connected to inputs of the summator 203. Similar to the embodiment of FIG. 2a, by controlling voltages in the power supply lines and at the first-kind 102 contacts, voltages at individual second-kind 103 contacts may be effectively measured.

Based on a value of voltage at a second-kind 103 contact, it may be determined whether any of the slave devices 108 is connected thereto. Preferably, the master device 101 may have more than two first-kind 102 contacts. At one of such contacts, a potential may be set, which is different from the potential set at the rest of first-kind 102 contacts. It is necessary to determine, based on the value of voltage at the second-kind 103 contact, the first-kind contact to which the slave device 108, connected to this second-kind 103 contact, is connected.

Furthermore, a first-kind 102 contact may be disconnected from the power supply source sides 109 and 110, i.e. electrically isolated. Therein, the voltage at the first-kind 102 contact will become equal to the voltage at the second-kind contact to which it is coupled via the slave device.

Preferably, the switches 107 are configured as transistor half-bridges.

In a preferred implementation, after each switching operation, the first-kind 102 and the second-kind 103 contacts become connected to different sides of the power supply source; thus, each switching operation will reverse the sign of voltage or, in other words, change the voltage direction at the contacts.

The impedances 105 may be active (resistors) or reactive (capacitors, inductance coils). The impedances may be configured as various combinations of said elements.

Preferably, the master devices 101 may have provided therein a microcontroller for controlling the switches 107 and receiving data from the voltage measurement means 104.

Each slave device 108 is connected to two electrical lines. One line connects the slave device to a first-kind 102 contact and the other line connects it to a second-kind 103 contact. Multiple slave devices 108 may be connected to one and the same line.

In a particular implementation, the slave device 108 is a circuit consisting of passive electric elements and converting an analog signal. Herein, by changing the voltage direction at the contacts to which the slave device 108 is connected and by determining the value of voltage at the second-kind 103 contact, a signal may be received from the slave device 108 in the form of a response from the passive circuit contained therein to the change in the voltage direction.

Figure 3:
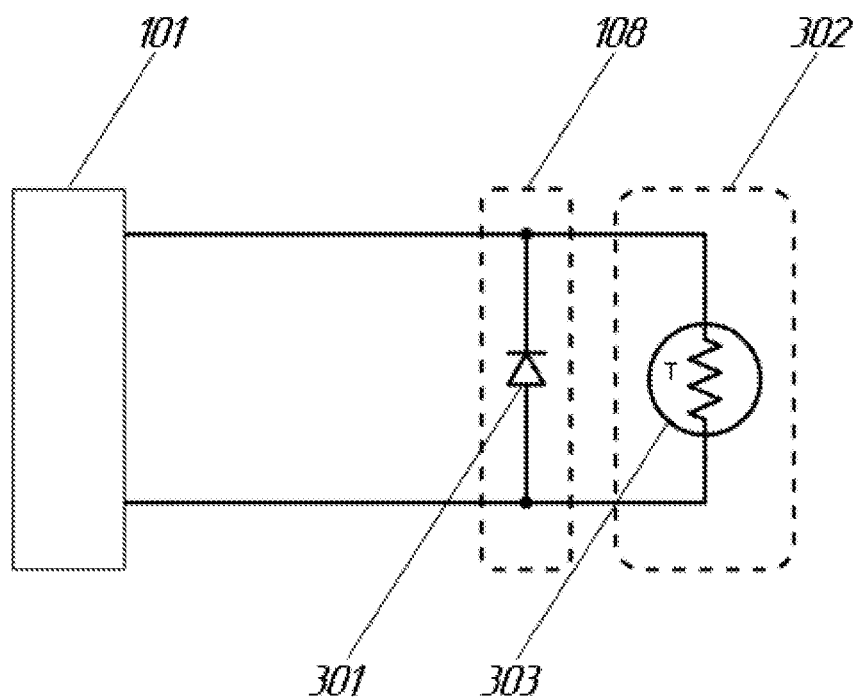
FIG. 3 shows an example circuit for analog signal transmitting.

Referring now to a case illustrated in FIG. 3, where the master device 101 impedance 105 is a resistor, the electrical circuit of the slave device 108 coupled thereto is configured as a rectifier diode 301, and the slave device 108 has connected thereto, in parallel to the diode, an external device 302 being a thermal resistor 303. In this case, an embodiment is implemented, wherein an analog signal is transmitted from the external device 302 via the slave device 108 to the master device 101. To this end, based on readings from the voltage measurement means 104, a sum of voltage drops in the lines interconnecting the devices 101 and 108 and in the circuit of the slave device 108 with the external device 302 connected thereto is determined at different voltage directions. At one voltage direction, the voltage drop in the slave device 108 becomes zero, and, based on the voltage drop in the line interconnecting the devices, its resistance may be determined. Taking this into account, at the other voltage direction, the resistance of the connected thermal resistor 303 may be determined. In this way, by using the described method, the objective of receiving data from an analog sensor, i.e. a thermal resistor, may be achieved.

Where the impedance 105 is reactive, the sum of the line and the slave device 108 impedances may be determined based on the change of voltage at the second-kind 103 contact over time.

Figure 4:
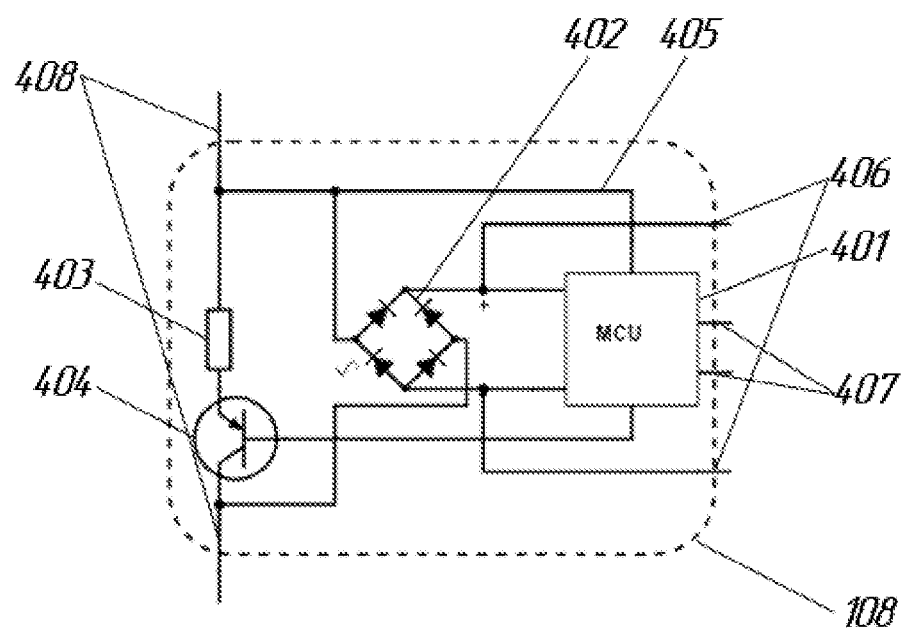
FIG. 4 shows an example circuit of a slave device comprising a microcontroller for implementing the claimed method.

In another implementation, the slave device 108 comprises a digital circuit. An embodiment of such circuit is shown in FIG. 4. This circuit allows determining the voltage direction at outputs and connecting a resistor between the outputs. The circuit comprises a microcontroller 401, an alternating-to-direct voltage converter (a diode bridge 402), a resistor 403 and a transistor 404. The resistor 403 is connected by opening the transistor 404. Polarity of the connection is determined by determining the voltage at the microcontroller 401 output 405. Power is supplied to the microcontroller 401 from the diode bridge 402. An external device may be connected to the circuit. The external device may receive power via the outputs 406 and may exchange data with the microcontroller via the outputs 407. The slave device 108 may be connected to the master device 101 by using the outputs 408. Overvoltage and electrostatic discharge protection elements may be added to this circuit.

To compensate for voltage drops at the resistances 105, a voltage higher than the slave devices' operating voltage is preferably set between the first-kind contacts and the internal power supply lines. Preferably, in this case, voltage reduction circuits are integrated in the slave devices' circuits.

A digital signal from the master device 101 to the slave device 108 is transmitted by varying the time interval (period) between voltage changes (voltage direction changes) at the first-kind 102 contacts and the master device 101 internal power supply line 106. The signal is received in the slave device 108 by continuously determining the connection polarity, thereby determining the duration of polarity inversion periods.

To transmit a signal from the slave device 108 to the master device 101, the total resistance between two contacts of the slave device 108 is repeatedly changed. The resistance between the device 108 contacts is changed by connecting and disconnecting the resistor. Furthermore, the device contacts 108 may be short-circuited to each other, that is to say, a zero Ohm resistor may be connected. A digital signal is transmitted by varying the period between connections. The master device 101 receives the signal by continuously determining the slave device 108 resistance, thus determining the periods between connections.

Furthermore, various variants may be used to transmit signals between the devices 101 and 108. Where more than one slave device 108 is connected to one and the same first-kind contact of the master device 101, a digital signal may be transmitted simultaneously to all slave devices connected to said contact. Addressing methods typical for common bus data transfer protocols may also be used.

A simultaneous bi-directional synchronous or asynchronous (full duplex) transmission of data between the master device 101 and the slave device 108 is possible.

In another implementation, the signal from the master device 101 to the slave device 108 may be a synchronizing signal for a signal being transmitted from the slave device 108 to the master device 101. In such implementation, the master device reverses, at regular time intervals, the voltage direction at the contacts, each such reversal of the contact voltage direction being a significant instant for the slave device 108.

Similarly, a signal from the slave device 108 to the master device 101 may be a synchronizing signal for a signal being transmitted from the master device 101 to the slave device 108.

In a product employing the present invention, the master device 101 may be configured as a flat plate having staggered, on its surface, the first-kind contacts and the second-kind contacts. The plate accommodates the slave devices, each slave device having two contacts exposed. The slave devices are designed such that their two exposed contacts can only be connected to adjacent contacts at said rectangular grid, i.e. to one first-kind 102 contact and one second-kind 103 contact. In such implementation, the master device 101 may have arranged thereon a large number of slave devices, may detect their positions and exchange data therewith.

The above implementation may be used in children's play sets. A user arranges the slave devices on the master device in a particular order. The master device 101 determines the contacts to which the slave devices are connected and activates light and acoustic indicators on the slave devices.

The above implementation may also be used in children's electronic construction sets. Therein, the master device 101 imitates a breadboard, while the slave devices imitate electrical components. The master device 101 detects the positions of the slave devices, calculates the resulting electrical circuit and activates light and acoustic indicators in accordance with the calculation.

It should be noted that the above description of various embodiments of the invention is provided as an example and should not be construed as limiting the scope of protection of the present invention, which is only defined by the scope of the appended claims.

The above particular embodiments have been described with reference to specific steps performed in a specific order; it should, however, be obvious that said steps may be combined, separated or performed in a different order without departing from the essence of the present invention. As such, the order or grouping of the steps do not limit the essence of the present invention.

The above embodiments have been described with reference to specific components connected to each other in a specific manner. In their regard, it should also be obvious that the invention may include a plurality of such components and that connections between them depend only on how much the number of identic components is increased without departing from the essence of the present invention.

The invention claimed is:

1. A method for transmitting signals between a master device and at least one slave device, wherein the master device has at least two external first-kind contacts, at least one internal power supply line, a voltage measurement means and at least one external second-kind contact connected directly to the voltage measurement means and, via an impedance, to one internal power supply line, the method comprises the steps of:

detecting a connection between one of the master device second-kind contacts and a slave device by determining the voltage at such second-kind contact;

identifying the master device first-kind contact to which the slave device is connected by setting different voltages at the first-kind contacts and determining the voltage at the second-kind contact;

changing the voltage between the first-kind contact to which the slave device is connected and the internal power supply line connected, via the impedance, to the second-kind contact to which the slave device is connected;

generating a signal in the slave device by changing resistance between the contacts connected to the master device; and receiving the signal in the master device by measuring the voltage at the second-kind contact to which the slave device is connected.

2. The method of claim 1, wherein the impedance between the master device second-kind contact and the internal power supply line is configured as an element selected from the group including a resistor, a capacitor and an inductance coil, or a combination thereof.

3. The method of claim 1, wherein the voltage measurement means is an analog-to-digital converter, each channel of which is connected to at most one second-kind contact.

4. The method of claim 1, wherein the voltage measurement means comprises an analog-to-digital converter and at least one voltage summator, each input of each voltage summator being connected to one second-kind contact, and the output of each voltage summator being connected to a channel of the analog-to-digital converter.

5. The method of claim 1, wherein the voltage measurement means comprises an analog-to-digital converter and at least two resistors, each resistor being connected to one second-kind contact and one channel of the analog-to-digital converter, more than one resistor being connected to at least one channel of the analog-to-digital converter.

6. The method of claim 1, wherein in order to measure the voltage at the second-kind contact, different voltages are set in the internal power supply lines.

7. The method of claim 1, wherein identifying the first-kind contact to which the slave device is connected includes dividing the first-kind contacts into two groups, one and the same voltage being set at all contacts in the first group, one and the same voltage, different from the voltage at the contacts in the first group, being also set at the contacts in the second group.

8. The method of claim 1, wherein receiving the signal in the master device includes setting a voltage of one magnitude in one internal power supply line and setting one and the same voltage of other magnitude in the rest of the internal power supply lines and at the first-kind contacts.

9. The method of claim 1, wherein changing the voltage between the first-kind contact to which the slave device is connected and the internal power supply line connected, via the impedance, to the second-kind contact to which the slave device is connected, includes reversing the sign of said voltage.

10. The method of claim 1, wherein the slave device is a circuit consisting of passive electric elements.

11. The method of claim 10, wherein the slave device is a rectifier diode or other rectifying element.

12. The method of claim 10, wherein an analog signal from an external device is transmitted via the slave device to the master device.

13. The method of claim 1, wherein the slave device receives power from its two contacts connected to the master device.

14. The method of claim 1, wherein the slave device includes a voltage converter converting voltages at two contacts of the slave device, which are connected to the master device, into direct voltage.

15. The method of claim 14, wherein other elements of the slave device receive power from outputs of said voltage converter.

16. The method of claim 14, wherein an external device connected to the slave device receives power from outputs of said voltage converter.

17. The method of claim 14, wherein the voltage converter is capable of converting high voltage to low voltage.

18. The method of claim 1, wherein a digital or a synchronizing signal is generated in the master device by changing the voltage between the first-kind contact to which the slave device is connected and the internal power supply line connected, via the impedance, to the second-kind contact to which the slave device is connected, said signal being received in the slave device by measuring the voltage at the two contacts connected to the master device.

19. The method of claim 18, wherein signals from the master device to the slave device and from the slave device to the master device are transmitted simultaneously.

20. The method of claim 1, wherein a signal is transmitted simultaneously to all slave devices connected to one and the same first-kind contact.

* * * * *